US009160758B2

(12) United States Patent
Sohn et al.

(10) Patent No.: US 9,160,758 B2
(45) Date of Patent: Oct. 13, 2015

(54) METHOD AND SYSTEM FOR PROTECTIVE DISTRIBUTION SYSTEM (PDS) AND INFRASTRUCTURE PROTECTION AND MANAGEMENT

(71) Applicants: Stephen Sohn, Clarksburg, MD (US); Scott Rye, La Plata, MD (US)

(72) Inventors: Stephen Sohn, Clarksburg, MD (US); Scott Rye, La Plata, MD (US)

(*) Notice: Subject to any disclaimer, the term of this patent is extended or adjusted under 35 U.S.C. 154(b) by 0 days.

(21) Appl. No.: 14/217,259

(22) Filed: Mar. 17, 2014

(65) Prior Publication Data
US 2014/0283074 A1    Sep. 18, 2014

Related U.S. Application Data

(60) Provisional application No. 61/786,460, filed on Mar. 15, 2013.

(51) Int. Cl.
*G06F 21/62* (2013.01)
*G08B 13/18* (2006.01)
*H04L 29/06* (2006.01)

(52) U.S. Cl.
CPC ........ *H04L 63/1408* (2013.01); *H04L 63/1433* (2013.01)

(58) Field of Classification Search
CPC . H04L 63/14; H04L 63/1408; H04L 63/1416; H04L 63/1433; H04L 63/1441
See application file for complete search history.

(56) References Cited

U.S. PATENT DOCUMENTS

| 3,735,353 | A | * | 5/1973 | Donovan et al. | ............. | 340/6.11 |
| 4,673,935 | A | * | 6/1987 | Spencer | ............. | 342/27 |
| 5,194,847 | A | * | 3/1993 | Taylor et al. | ............. | 340/557 |
| 6,288,640 | B1 | * | 9/2001 | Gagnon | ............. | 340/539.17 |
| 6,421,632 | B1 | * | 7/2002 | LeCorney | ............. | 702/185 |
| 6,819,849 | B1 | * | 11/2004 | Tangonan et al. | ............. | 385/126 |

(Continued)

FOREIGN PATENT DOCUMENTS

WO    WO 2006053273 A2 *  5/2006

OTHER PUBLICATIONS

Accu-tech Guardian, retrieved from https://web.archive.org/web/20121115040632/http://www.accu-tech.com/protected-distribution-system/, Nov. 15, 2012, pp. 1-4.*

(Continued)

*Primary Examiner* — Kaveh Abrishamkar
*Assistant Examiner* — James J Wilcox
(74) *Attorney, Agent, or Firm* — Pillsbury Winthrop Shaw Pittman, LLP

(57) ABSTRACT

A method and system for managing a protective distribution system is disclosed. The method includes monitoring an information transmission line, detecting a disturbance on the information transmission line, displaying the disturbance as a graphical representation, comparing the disturbance to a preset threshold, and triggering an alert if the disturbance is greater than the preset threshold or the number of disturbances less than the preset threshold meets a preset number within a preset time period. A system for managing a protective distribution system is also provided. The system includes a set of instructions which when executed causes a processor to perform a method for managing an information transmission line. The system further includes an intrusion detector, an optical line terminal and/or network switch, an optical circuit switch, an optical test access point device, and a network analytic tool.

18 Claims, 14 Drawing Sheets

(56) References Cited

U.S. PATENT DOCUMENTS

| | | | |
|---|---|---|---|
| 6,980,108 B1* | 12/2005 | Gebbia et al. | 340/555 |
| 7,092,586 B2* | 8/2006 | Vokey et al. | 385/12 |
| 7,403,674 B2* | 7/2008 | Murphy et al. | 385/12 |
| 8,135,278 B2* | 3/2012 | Lee et al. | 398/68 |
| 8,355,406 B1* | 1/2013 | Shimamoto | 370/400 |
| 8,947,232 B2* | 2/2015 | Strong et al. | 340/555 |
| 2007/0253662 A1 | 11/2007 | Patel et al. | |
| 2009/0031426 A1* | 1/2009 | Dal Lago et al. | 726/26 |
| 2009/0040046 A1 | 2/2009 | Browning, Jr. et al. | |
| 2010/0091676 A1 | 4/2010 | Moran et al. | |
| 2010/0117830 A1* | 5/2010 | Strong et al. | 340/555 |
| 2010/0209047 A1 | 8/2010 | Cheung et al. | |
| 2011/0241881 A1* | 10/2011 | Badinelli | 340/541 |
| 2014/0091929 A1* | 4/2014 | Murphy et al. | 340/541 |

OTHER PUBLICATIONS

Alcon-Tech iSPY Fiber Optic Intrusion Detection System Data Sheet, retrieved from http://www.alcon-tech.com/pdf/iSPY.pdf, Jun. 2006, pp. 1-5.*

Allwood, Fibre Optic Acoustic Sensing for Intrusion Detection Systems, Edith Cowan University, Research Online, ECU Publications 2011, pp. 1-7.*

Vigil, "An Evaluation of Fiber Optic Intrusion Detection Systems in Interior Applications," Mar. 1994, pp. 1-46.*

Mahmoud, "Nuisance Alarm Suppression Techniques for Fibre-Optic Intrusion Detection Systems," Third Asia Pacific Optical Sensors Conference, 2012, pp. 1-8.*

NSTISS, "Protective Distribution Systems," Dec. 13, 1996, pp. 1-13.*

International Search Report and Written Opinion dated Aug. 28, 2014 for Appln. No. PCT/US 14/30330.

* cited by examiner

METHOD AND SYSTEM FOR PROTECTIVE DISTRIBUTION SYSTEM (PDS) AND INFRASTRUCTURE PROTECTION AND MANAGEMENT

This application claims priority to provisional patent application Ser. No. 61/786,460 filed on Mar. 15, 2013, the disclosure of which is incorporated by reference herein in its entirety.

BACKGROUND

The present invention relates to monitoring an information transmission line and more particularly to a method and system for managing a protective distribution system.

The protection of sensitive data has traditionally been focused on data encryption and physical security carriers (conduits) that house IT infrastructure cabling. An example of an encryption device is a TACLANE (short for "Tactical FASTLANE" or Tactical Local Area Network Encryption). A TACLANE is a network encryption device developed by the National Security Agency (NSA) to provide network communications security on Internet Protocol (IP) and Asynchronous Transfer Mode (ATM) networks for the individual user or for enclaves of users at the same security level. An example of a physical security carrier is a Protective Distribution System (PDS). A PDS is a wireline or fiber-optics telecommunication system that includes terminals and adequate acoustical, electrical, electromagnetic, and physical safeguards to permit its use for the unencrypted transmission of classified information. PDS systems are not managed via software, thereby leaving the intrusion detection process and information tracking up to paper logs and human inspections once every 24 hours. When an intrusion is detected it is completely unknown what type of information was taken during the 24 hours between inspections. The lack of software management and the protection of sensitive data infrastructures have been and continue to be vulnerabilities.

Thus, there is a need to overcome the afore-described challenges in protective distribution systems and in infrastructure protection and management.

SUMMARY

Various embodiments as described herein solve these and other problems by providing methods and systems for protective distribution system (PDS) and infrastructure protection and management.

In a first aspect of the invention, a method for managing an information transmission line is disclosed. In one embodiment, the method includes monitoring an information transmission line, detecting a disturbance on the information transmission line, displaying the disturbance as a graphical representation, comparing the disturbance to a preset threshold, and triggering an alert if the disturbance is greater than the preset threshold or the number of disturbances less than the preset threshold meets a preset number within a preset time period.

In a second aspect of the invention, a computer-readable medium for storing computer instructions comprising instructions for managing an information transmission line is disclosed. In one embodiment, the computer-readable medium comprises a set of instructions to perform a method for managing an information transmission line. The method includes monitoring an information transmission line, detecting a disturbance on the information transmission line, displaying the disturbance as a graphical representation, comparing the disturbance to a preset threshold, and triggering an alert if the disturbance is greater than the preset threshold or the number of disturbances less than the preset threshold meets a preset number within a preset time period.

In a third aspect of the invention, a system for managing an information transmission line is disclosed. In one embodiment, the system includes a computer having a set of instructions which when executed causes a processor to perform a method for managing an information transmission line. The method includes monitoring an information transmission line, detecting a disturbance on the information transmission line, displaying the disturbance as a graphical representation, comparing the disturbance to a preset threshold, and triggering an alert if the disturbance is greater than the preset threshold or the number of disturbances less than the preset threshold meets a preset number within a preset time period. The system further includes an intrusion detector, an optical line terminal and/or network switch, an optical circuit switch, an optical test access point device, and a network analytic tool.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

DETAILED DESCRIPTION

All publications, patents, and patent applications cited in this specification are hereby incorporated by reference in their entirety. The detailed description provided below in connection with the appended drawings is intended as a description of exemplary embodiments and is not intended to represent the only forms in which the invention may be constructed or utilized. The same or equivalent functions and sequences may be accomplished by different embodiments as will be appreciated by those skilled in the art.

Figure 1:
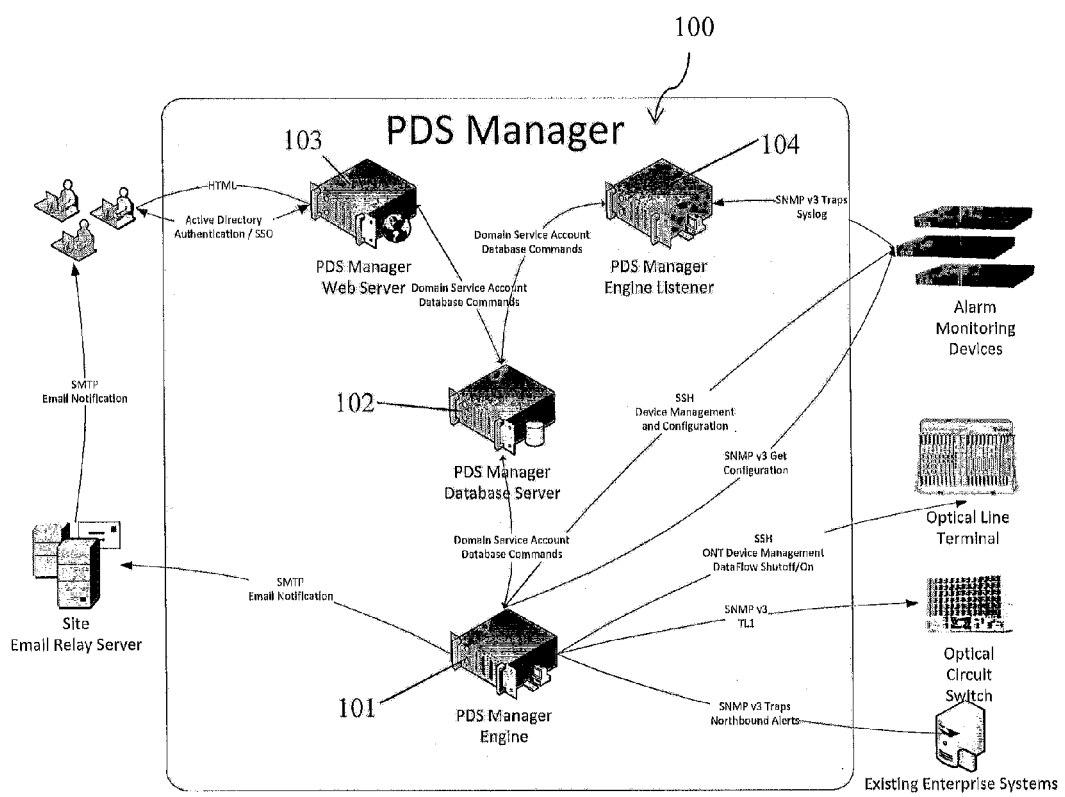
FIG. 1 is a block diagram showing a system architecture.

FIG. 1 illustrates a block diagram of a system 100 according to an embodiment. System 100 may be used to provide proactive real-time alarm monitoring of dark fiber intrusions and may distribute notification of alarms of suspected tampering to a variety of endpoints. System 100 may include a manager engine 101, a manager database server 102, a manager web server 103, and a manager engine listener 104. In an embodiment, system 100 may include one or more components that functions as any of the manager engine, manager database server, manager web server, and manager engine listener.

System 100 may integrate with a variety of network devices to offer alarm detection and alarm response capabilities in a consolidated system. In an embodiment, system 100 may integrate with Passive Optical Network (PON) equipment, Optical Circuit Switch equipment, Optical Test Access Point equipment, and Network Analyzers to stop and start data flow to network endpoints, re-route data flow, and record or further analyze data when alarms are detected and resolved. Alarm events may be captured in a case management oriented workflow for auditing and analytics.

System 100 may provide the ability for complete network mapping of components starting from a source Optical Line Terminal (OLT) down to an end user Optical Network Terminal (ONT). Network components may be enrolled and maintained in system 100 in a logical and efficient manner. System views and reports may be leveraged to inspect an entire network as well as each data run.

System 100 may handle the coordination of tasks between dark fiber alarm monitoring devices and PON equipment through backend adapters leveraging Simple Network Management Protocol (SNMP) traps and Secure Shell (SSH) protocols. System 100 may be monitored actively and passively to assure events are not missed.

System 100 may offer a secure web user interface to provide network operations center (NOC) oriented dashboards for proactive monitoring. Notification of events may be handled in a guaranteed delivery manner over SMTP and HTTP to assure best effort notification to a targeted endpoint so first responders can focus on the status of the remaining system. Maps and images may be immediately provided with floor plan layouts overlaid with network diagrams for an alarmed area to reduce critical decision times for resolving alarms. System 100 may allow staff to identify a suspected intrusion event, isolate its location, notify responder groups, execute planned remediation, and track its history.

In an embodiment, system 100 offers a warning threshold technology to suppress the occurrence of nuisance alarms. A configurable threshold may allow system 100 to filter out accidental or environmental disturbances from actual intrusion attempts.

System 100 may integrate into an existing enterprise by providing consolidated alerts to 'north-bound' systems over SNMP. System 100 may also integrate with any existing Active Directory authentication system to assure its operation is consistent with pre-established IT security policies and site practices. System 100 may be supported by a relational database to provide redundancy, durability, recovery protection, and tools for data extraction and analysis.

In an embodiment, system 100 may provide health reports by providing analytics and reporting on all warnings and alarms captured by system 100. System 100 may provide trend reporting and predictive analysis. System 100 may publish and disseminate the results of the analysis to a configurable group of users at a configurable time period and frequency.

In an embodiment, system 100 may provide infrastructure management for PON Systems. System 100 may provide a graphical and textual depiction of an end to end path for a circuit. For example, one end may start from a port on an optical line terminal and/or network switch joined with a port on an intrusion detector then continue to an optical circuit switch then continue through a trunk cable then continue to a splitter then continue to a zone box then continue to a fiber run to an user area then continue to a user end device, such as an optical network terminal. Each of the devices, passive or active, and each cable run may be represented in the system graphically and textually.

System 100 may provide the ability to add, modify, or delete representative circuit paths. System 100 may track device types, identification numbers, and locations for each device. System 100 may display each circuit path overlaid on a physical diagram, such as a building or floor computer-aided design (CAD) diagram. System 100 may provide querying and reporting capabilities for each device. System 100 may highlight a circuit path when displayed in a graphical view.

Figure 2:
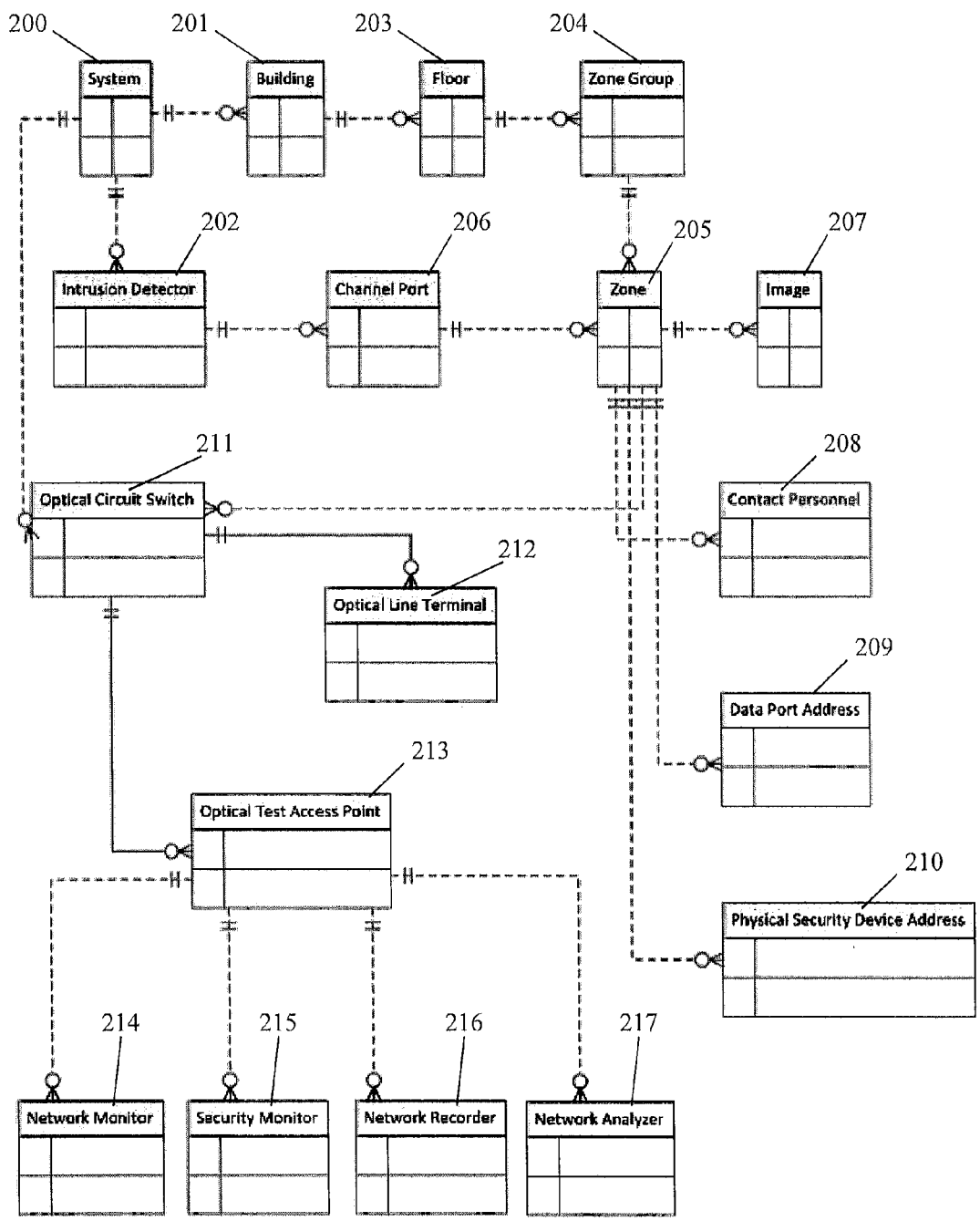
FIG. 2 is a block diagram showing an overview of an exemplary PDS and IT infrastructure management system.

Turning to FIG. 2, a schematic diagram showing an overview of a PDS and information technology (IT) infrastructure management system according to an embodiment is shown. In one embodiment, system 200 may be system 100 described above. In one embodiment, system 200 may manage an intrusion detector 202, which monitors a building 201. System 200 may provide the ability to receive alerts when intrusion detector 202 detects intrusion attempts. System 200 may also provide the ability to manage certain features of intrusion detector 202. As will be explained in greater detail below, such features may include learning mode, configuration, enabling and disabling monitoring on a channel port, and reading and updating a threshold setting. Exemplary intrusion detectors that system 200 may integrate with are Network Integrity Systems' INTERCEPTOR, VANGUARD, and INTERCEPTOR LD2.

In one embodiment, system 200 tracks a floor 203 of building 201 that is monitored by intrusion detector 202. Each monitored floor 203 may contain one or more zone groups 204. Within each zone group 204 may be a collection of zones 205, each of which may correspond to a single channel port 206 on intrusion detector 202. Though not depicted in the figure, system 200 may also be used to manage a collection of campuses, each of which may contain a collection of buildings.

System 200 may manage a collection of intrusion detectors 202. Intrusion detector 202 may contain a channel port 206, which corresponds to a zone 205. A zone 205 correlates to a physical location that is being monitored by system 200. A zone 205 may have an image 207, which may include computer-aided design drawings, first person perspective images, or video, to aid users in inspections. A zone 105 may also be associated with a contact personnel 208. Contact personnel 208 may be notified in the event of an intrusion attempt.

System 200 may be configured so that a zone 205 has a data port address 209 associated with the zone to integrate with a data providing networking equipment, such as an optical circuit switch or optical line terminal and/or network switch. In the event of an intrusion attempt in zone 205, system 200 may disable or re-route data by sending a command to a networking equipment using data port address 209. System 200 provides the ability to enable or disable data on a specific port and also provide the ability to read and update details for a port. Some example devices that system 200 may integrate with are Tellabs PON, Zhone PON, and Motorola POL.

Zone 205 may also have a physical security device address 210 associated with the zone. In the event of an intrusion attempt in zone 205, system 200 may adjust physical security including locking doors, recording on IP based cameras, etc. by sending a command to physical security address 210.

System 200 may also manage an optical circuit switch 211. Optical circuit switch 211 may provide the ability to disable, enable, or re-route an optical transmission. Optical circuit switch 211 may have an optical line terminal and/or network switch 212. Optical line terminal and/or network switch 212 may convert and provide a fiber optical signal to a data network. System 200 may also provide the ability to perform a bulk enrollment of a cross connect defined during initial installation or subsequent reconfiguration. An example device that system 200 may integrate with is the Calient 5320 or CyberSecure Cyber Patch Panel.

Optical circuit switch 211 may have an optical test access point 213. Optical test access point 213 may allow system 200 to provide an ability to route or copy network data. Optical test access point 213 may deliver an identical copy of network traffic to a network analytic tool, such as a network monitor 214, a security monitor 215, a network recorder 216, a network analyzer 217, and other analytic tools. An example of an optical test access point device that system 200 may integrate with is the Mimetrix OpticalTAP.

Figure 3:
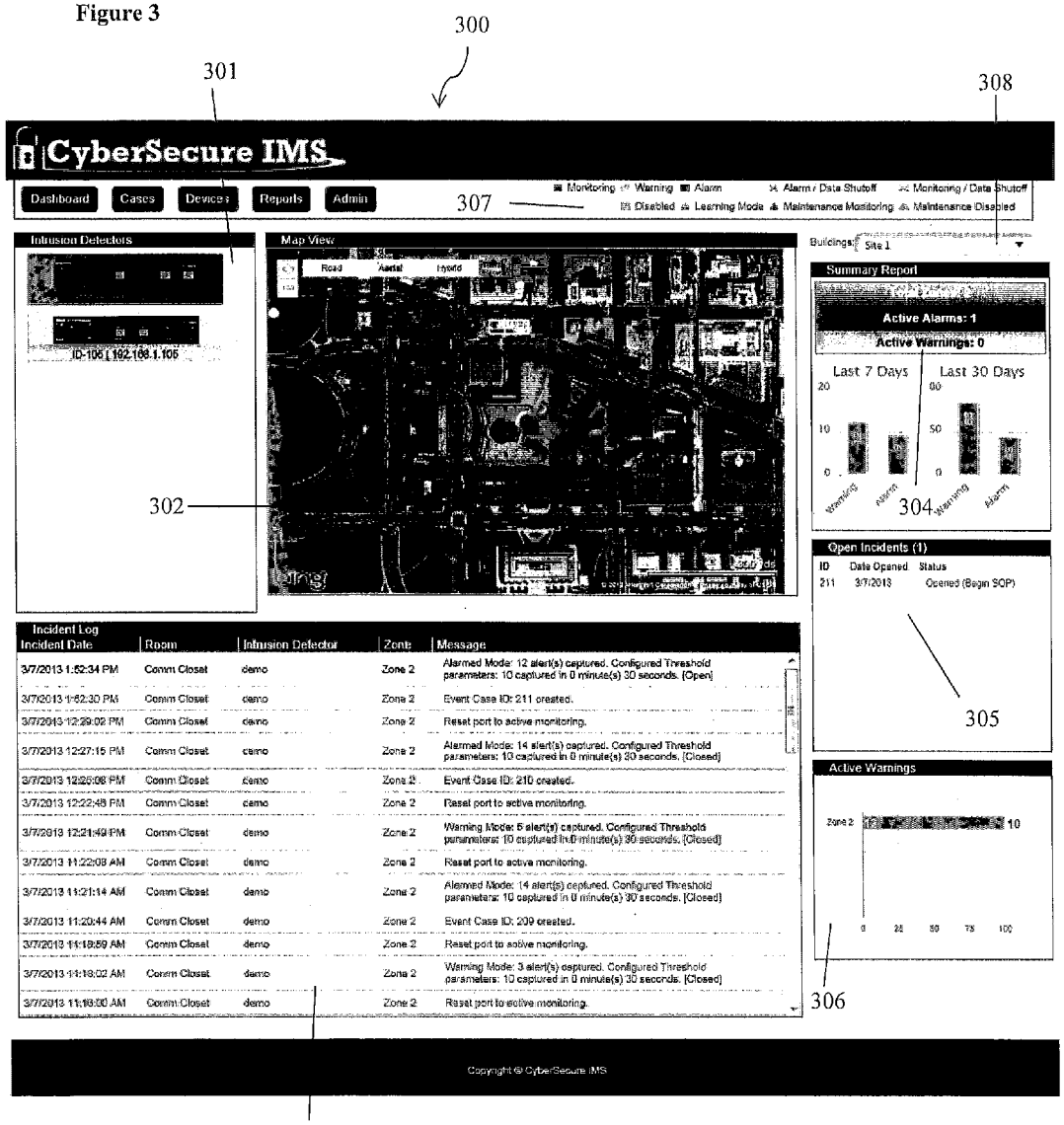
FIG. 3 is a screenshot of a dashboard.

Turning to FIG. 3, a dashboard 300 according to an embodiment is shown. Dashboard 300 may provide a consolidate view from a system and allow network personnel to determine the health of a network with multiple visual indicators.

Intrusion detectors panel 301 may display a list of all intrusion detectors managed by a system. Each intrusion detector displays a colored icon for a channel port. The colored icons may correlate to a label provided in legend 307. Each intrusion detector may be associated with a unique label, which may include information such as a user defined name, IP Address, etc. The background for the intrusion detector as shown in intrusion detector panel 301 may be programmed to change according to the status of the intrusion detector. For example, the background for an intrusion detector with a channel port in an alarmed state may be colored red. The list of intrusion detectors may be filtered to a building specific intrusion detector when a building is selected in a building drop down list 308 or when a building icon is selected in a map view panel 302.

Map view panel 302 may be configured to display a map image with visual indicators for a building managed by a system. The location of the visual indicators may be based on the geographic coordinates of a building. The color of the visual indicator may provide a combined status for each of the intrusion detector's channel ports managed in a building. According to one embodiment, the background colors may be determined in the following hierarchy:

If one or more channel ports are in an alarmed state, the color will be red.
 If one or more channel ports are in a warning state and none are in an alarmed state, the color will be yellow.
 If no channel ports are in an alarmed or a warning state, the color will be green.

Building list 308 may contain the building names for all of the buildings managed by a system. Building list 308 may be set to a default option, e.g. option 'A1', if there are multiple buildings managed by a system. Otherwise, the list may default to a single building managed by a system. When a user selects a building, a system may filter a list of intrusion detectors in intrusion detector panel 301 to only show the devices managed in the selected building.

An incident log panel 303 may display a list of events captured or enacted by a system in response to an alert. In one embodiment, incident log panel 303 may display Incident Date, Room Name, Intrusion Detector Name, Zone Name, and Incident Message for an incident. An incident log may contain the most recent incidents for a given time parameter which may be configured in a system.

A summary report panel 304 may display a total number of zones monitored by a system. Also included may be the number of active alarms in a system as well as the number of active warnings. Summary report panel 304 may also include a chart of all warnings and alarms captured by a system in a specified time period, such as the last 7 days or the last 30 days.

An open incidents panel 305 may include a list of open cases. Open incidents panel 305 may list the ID, Date Opened, and Status for an open case.

An active warnings panel 306 may include a list of all open and active warnings. As will be described in more detail below, active warnings may be set when a set number of disturbances or alerts are captured in a defined amount of time before reaching a configured alarm threshold. The active warning feature may be known as a Zonar Warning System, a Visual Active Alert Indicator. Active warnings panel 306 may also display a graphical chart to show the number of disturbances or alerts captured by a system for a given zone as well as the alarm threshold level for the given zone. When there are no active incidents, a system may display the last number of warning events on the screen, such as the last 5 warning events.

Figure 4:
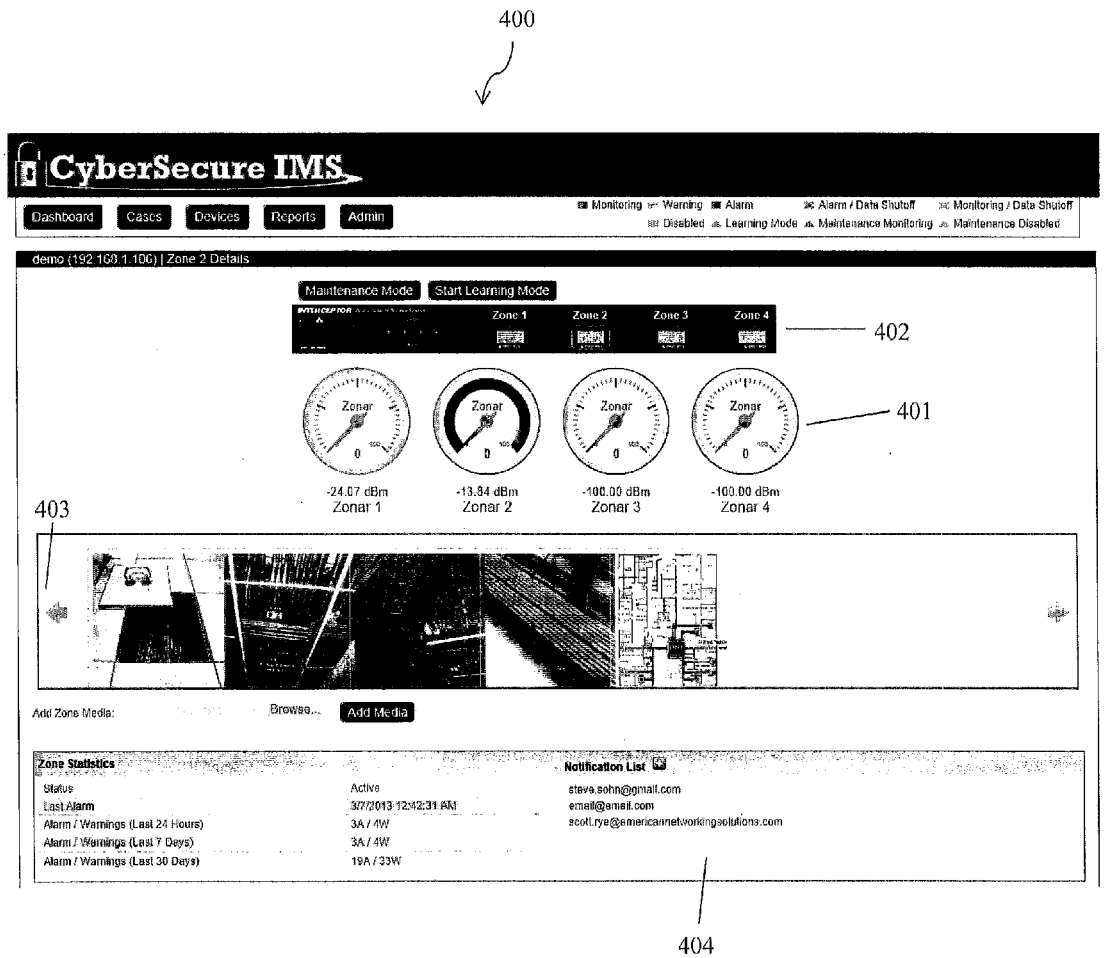
FIG. 4 is a screenshot of a zone screen.

Turning to FIG. 4, a zone screen display 400 according to an embodiment is shown. Zone screen display 400 may show a live representative view of a zone monitored by an intrusion detector. Zone screen display 400 may show a gauge 401, which may be known as a Zonar Warning Gauge, which displays a current active warning count received by a zone and a current power level reading for a zone. In the event of receiving an alert, zone screen display 400 may show the current alert count and the numeric alarm threshold value by displaying the values in a gauge 401. Similarly, in the event of receiving an alert, zone screen display 400 may show the severity of the alert by displaying a disturbance level in a power meter icon 402.

In one embodiment, power meter icon 402 may display the following levels:
 Minor—based on a configurable threshold on a lower end of a disturbance spectrum.
 Moderate—based on a configurable threshold in between a Minor and a Major threshold.
 Major—based on a configurable threshold on a higher end of a disturbance spectrum.
 Critical—indicates a boundary alarm, which may occur when a cable is damaged or removed from an intrusion detector port.

Zone screen display 400 may also show a media 403 related to a zone. Media 403 may be in an image, video, or document format. A system may allow users with the appropriate privileges to add or remove a zone media and enter the required descriptive text for each media item. Zone screen display 400 may include additional section 404 to display information such as status of the zone, time of last alarm, alarm/warnings in the past 24 hours/7 days/30 days, and notification list for the zone.

Figure 5:
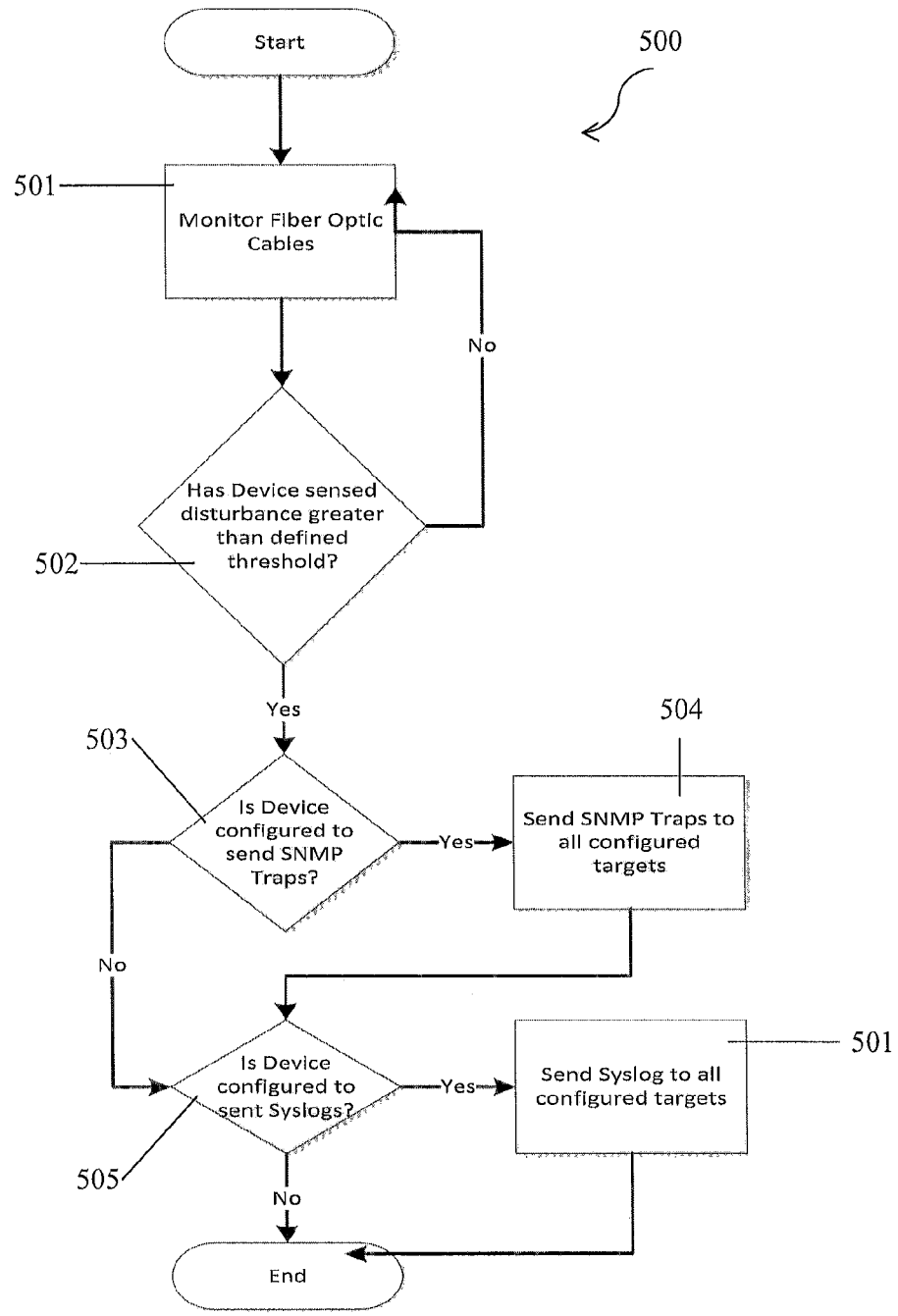
FIG. 5 is a flowchart for monitoring alerts.

Turning to FIG. 5, a flowchart for creating an alert 500 according to an embodiment is shown. In 501, an intrusion detector monitors a fiber optic cable. In one embodiment, monitoring may be performed by comparing a light transmitted to a light received in order to detect if a disturbance has occurred. In other embodiments, monitoring may be performed on vibration readings, frequency readings, changes in dB, optical time-domain reflectometer (OTDR), acoustic readings, distance determination based on reflective sensors, or combinations thereof. When a disturbance is detected, the disturbance may be compared to a defined threshold in 502. If the disturbance is less than the defined threshold, the intrusion detector may return to monitoring a fiber optic cable in 501. If the disturbance is greater than a defined threshold, the intrusion detector may send an alert to a target based on a configured setting.

In one embodiment, in 503 and 504, an intrusion detector configured to send simple network management protocol (SNMP) traps may send SNMP traps to configured targets. In 505 and 506, an intrusion detector configured to send Syslog entries may send Syslog entries to configured targets.

Figure 6:
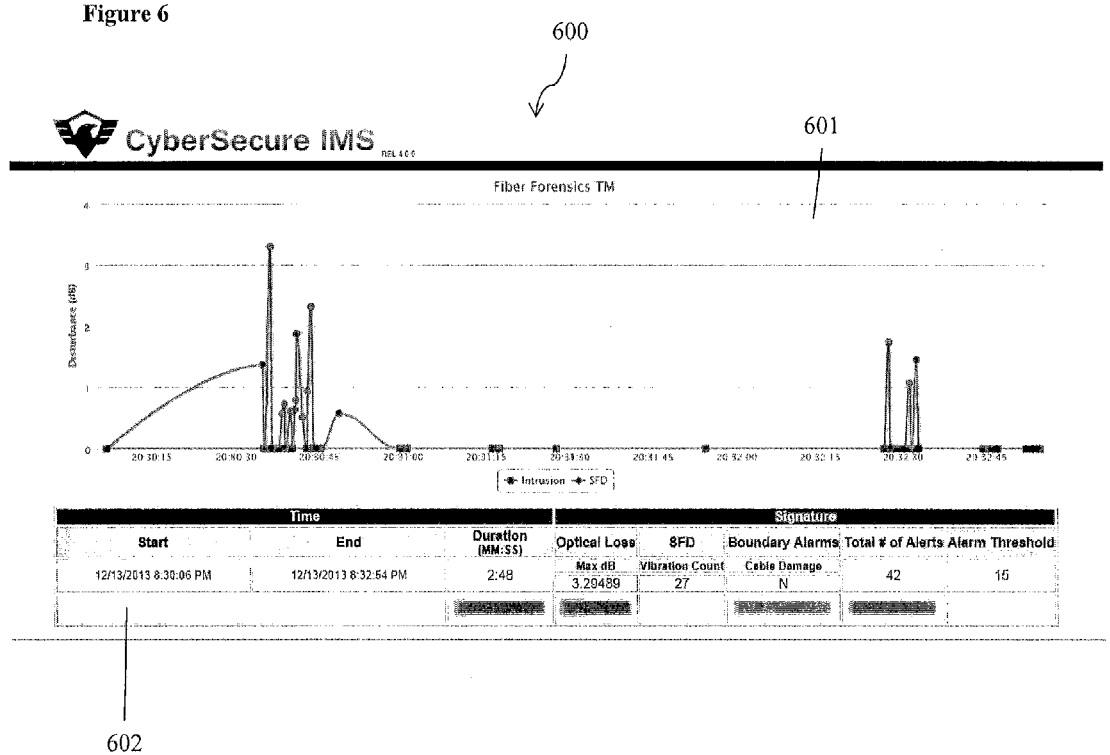
FIG. 6 is a screen shot of a fiber forensic graphical display.

In one embodiment, a detected disturbance may be presented to a user as a graphical representation. FIG. 6 shows a screen shot of one embodiment of a graphical representation of detected disturbances. Graph 601 shows a detected disturbance as a function of time. The graphical points may be plotted based on the level of dB difference registered on the transmission line during the disturbance and represented accordingly with a unique graphical icon. Additional graphical points may be plotted based on vibration and acoustic calculations registered on the transmission line during the disturbance and represented accordingly with a unique graphical icon. Summary section 602 shows different characteristics of the detected disturbances. The graphical representation may include time characteristics of the detected disturbance including the start time, end time, and total duration of the detected disturbance. The graphical representation may include disturbance characteristics of the detected disturbance including the maximum optical loss measured in dB, the number of registered vibration or acoustic events, the detection of cable damage, and the total number of distinct disturbances. The graphical representation may be used by a user to determine whether an immediate alarm response is required and which alarm response team member would be able to perform the on-site inspection. Similarly, the graphical representation may be used to indicate to the user where to perform the onsite inspection first. The graphical representation showing a short duration with fluctuating dB loss may indicate that inspection starts where the transmission line is readily exposed such as in a telecommunications closet. The graphical representation showing a long duration starting with many vibration or acoustic disturbances followed by multiple fluctuating dB loss disturbances may indicate an injection of an optical tap and that the inspection include a visual inspection of the entire transmission line. The graphical representation showing optical signatures indicative of accidental contact with a low severity would be represented accordingly. Similarly, optical signatures of a sever event such as the insertion of a fiber optic tap would be represented accordingly. While the graphical representation shown in FIG. 6 and described herein depicts an exemplary graphical representation of the detected disturbance, other graphical representations arranged with different plot points may be implemented based on different interfaces with various intrusion detection hardware.

Figure 7:
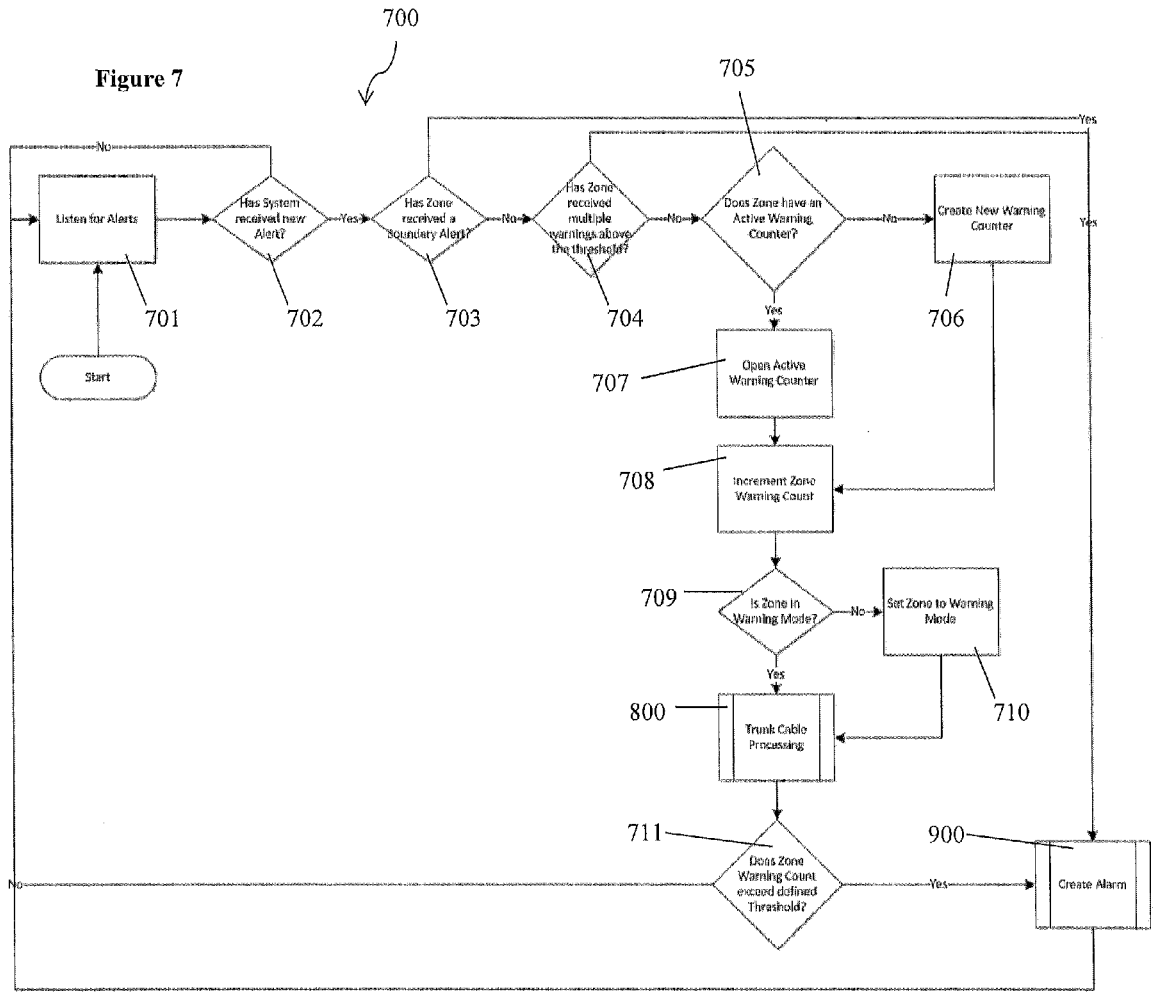
FIG. 7 is a flowchart for processing alerts.

In FIG. 7, a flowchart for alert processing 700 by a system according to an embodiment is shown. In 701, a system may keep an open port to listen for an alert. In 702, the system determines if an alert has been received by a target. If an alert has been received, the system translates the alert to determine a zone number for the alert. In 703, the system determines if the alert is a boundary alarm. Boundary alarms may be classified as critical severity. If the alert is a boundary alarm, the system creates an alarm as defined in 'create alarm' sub process 900.

If the system determines that the alert is not a boundary alarm in 703, the system may check in 704 to see if multiple warnings above a defined threshold or criteria in a have been received in a defined period of time. For example, the system may check to see if there have been 3 other previous warnings occurring within the past 24 hours for the zone. If the zone does have multiple warnings that meet a defined criteria, the system creates an alarm as defined in 'create alarm' sub process 900.

If the system determines in 704 that the zone has not have multiple warnings that meet a defined criteria, the system may check to see if the zone has an active warning counter in 705. The system creates a new warning counter for a zone in 706 if the zone does not have an active warning counter. If the zone does have an active warning counter, the system opens the warning counter in 707. With an active warning counter identified for the zone, the system increments the warning count for the zone in 708. In 709, the system determines the status of the zone. If the zone is in a warning mode, the system proceeds to a trunk cable processing sub process 800. A warning mode may be defined as a warning count of greater than 1. If the zone is not in a warning mode, the system sets the zone to a warning status in 710 and then proceeds to 'trunk cable processing' sub process 800.

In one embodiment, the system evaluates trunk cable processing in a 'trunk cable processing' sub process 800. After the trunk cable processing sub process, the system moves on to 711 to determine if the warning count exceeds the defined threshold for the zone. If the warning count exceeds the defined threshold for the zone, the system creates an alarm in 'create alarm' sub process 900 and then returns to 701 to listen for alerts. If the warning count does not exceed the defined threshold for the zone, the system returns to 701 to listen for alerts. While the flowchart shown in FIG. 7 and described herein depicts an exemplary workflow for processing an alert, other workflows arranged in a different order may be implemented.

Figure 8:
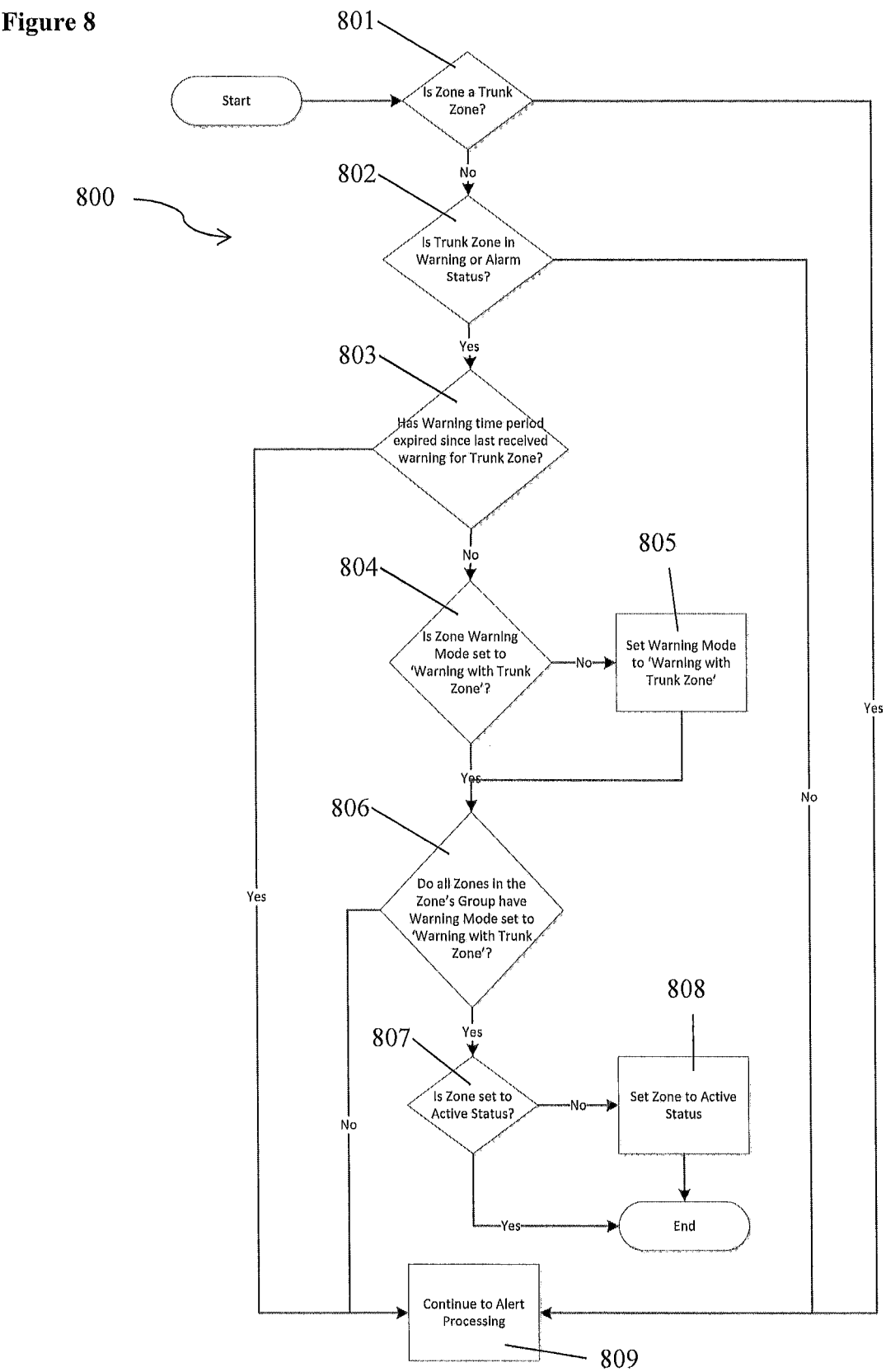
FIG. 8 is a flowchart of a trunk cable processing subprocess.

In FIG. 8, a flowchart for 'trunk cable processing' sub process 800 according to an embodiment is shown. In 801, a system determines if the zone is a trunk zone. In one embodiment, a trunk zone may be defined as a zone that includes a trunk cable. A trunk cable may be co-bundled with monitoring cables for each floor. At each floor, the cables dedicated to that floor may distribute out to the floors. A trunk cable and remaining floor cables may continue down a riser closet (e.g. communication network closets that traverse up and down an area of a building). Having a dedicated trunk zone that may be monitored by a system may allow for a logical separation of user zones (e.g. network cables distributing data throughout a floor of a building) from a riser closet and a source closet (e.g. place where network data for a building originates). Without a trunk cable, on an intrusion or disturbance, an investigator may be required to inspect an entire user zone and then back up a riser closet and back to a source closet. Logical separation may allow for meeting an inspection requirement, such as an inspection being required within 15 minute of an alert.

If the zone is a trunk zone, the system proceeds to 809 to evaluate the alert as a standard zone and returns to step 711 as described above. If the zone is not a trunk zone, the system continues to 802 to determine if the trunk zone is in a warning or an alarmed status. If the system is not in a warning or alarmed status, the system proceeds to 809 to evaluate the alert as a standard zone and returns to step 711 as described above. If the trunk zone is in a warning or an alarmed status, the system proceeds to 803 and determines if a warning time period has expired since the last received warning for the trunk zone. The warning time period may be configured by a user to a desired length. If the warning time period has expired, this may indicate an intrusion attempt on a separate zone in addition to an intrusion attempt on the trunk zone and the system proceeds to 809 to evaluate the alert as a standard zone and returns to step 711.

If the system determines in 803 that the warning time period has not expired, this may indicate that there is an alert in a zone in conjunction with the trunk zone and the system proceeds to 804. In 804, the system determines if the zone warning mode has been set to a predetermined setting. In one embodiment, the predetermined setting may be 'Warning with Trunk Zone'. In one embodiment, if the zone does not have a warning mode of 'Warning with Trunk Zone' 804, the system sets the warning mode to 'Warning with Trunk Zone' in 805 prior to moving onto 806. In 806, the system evaluates if all zones in the zone's zone group have warning modes set to 'Warning with Trunk Zone'. In one scenario, if a cable in a riser closet is disturbed, the trunk cable and all of the cables that are monitoring the floors below will set off alerts. In this case, the floor cables will have a 'Warning with Trunk Zone' status so the system can separate these from a user zone. If not, the system proceeds to 809 to evaluate the alert as a standard zone and returns to step 711.

If all zones in the zone's zone group have warning modes set to 'Warning with Trunk Zone', this may indicate that the entire zone group has received alerts in conjunction with the trunk zone. In that instance, the system will not evaluate the alert as a standard zone, but instead the system may suppress it. The system then proceeds to 807 to determine if the zone is set to active status. If not, the system sets the zone to active status in 808 and proceeds to continue to alert processing. While the flowchart shown in FIG. 8 and described herein depicts an exemplary workflow for a trunk cable processing sub process, other workflows arranged in a different order may be implemented.

Figure 9:
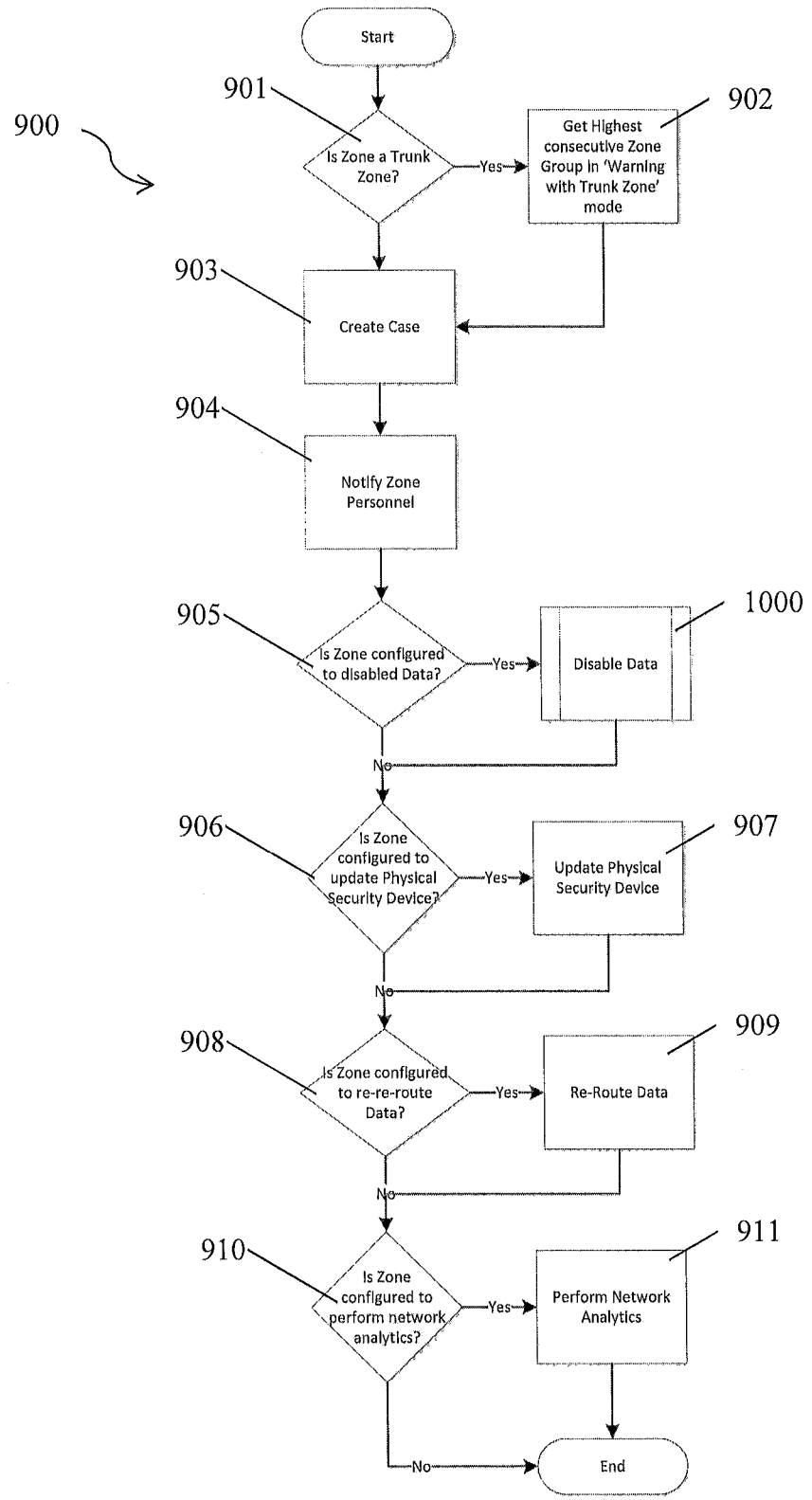
FIG. 9 is a flowchart of a create alarm subprocess.

Turning to FIG. 9, a flowchart for 'create alarm' sub process 900 according to an embodiment is shown. A system may create an alarm according to 'create alarm' sub process 900 when a zone receives a boundary alert, when a zone receives multiple warnings above a criteria, or when a zone warning count exceeds a defined threshold for the zone. In 901, a system evaluates if a zone is a trunk zone. If the zone is a trunk zone, the system may retrieve the highest consecutive zone group with a warning mode of 'Warning with Trunk Zone' in 902. A system may indicate this information in a case as described in more detail below.

A system may create and opens a case in 903. If a case was opened due to a boundary alert, a system may notate the case accordingly. In 904, a system may notify a personnel related to a zone. If a case was opened due to a boundary alert, a system may notate the notification accordingly. In 905, a system may determine if a zone is configured to disable data. If yes, the system may perform a disable data sub process 1000. In 906, a system may determine if a zone is configured to update a physical security device. If yes, the system may perform the action based on a zone setting by sending a command to the physical security device management platform in 907. In 908, a system may determine if a zone is configured to re-route network data. If yes, the system re-routes data based on a zone setting by sending a command to an optical circuit switch in 909. In 910, a system may determine if a zone is configured to perform network analysis. If yes, the system performs an action based on a zone setting by sending a command to an optical test access point in 911. A system may communicate with a network analytic tool based on a defined action. While the flowchart shown in FIG. 9 and described herein depicts an exemplary workflow for a create alarm sub process, other workflows arranged in a different order may be implemented.

Figure 10:
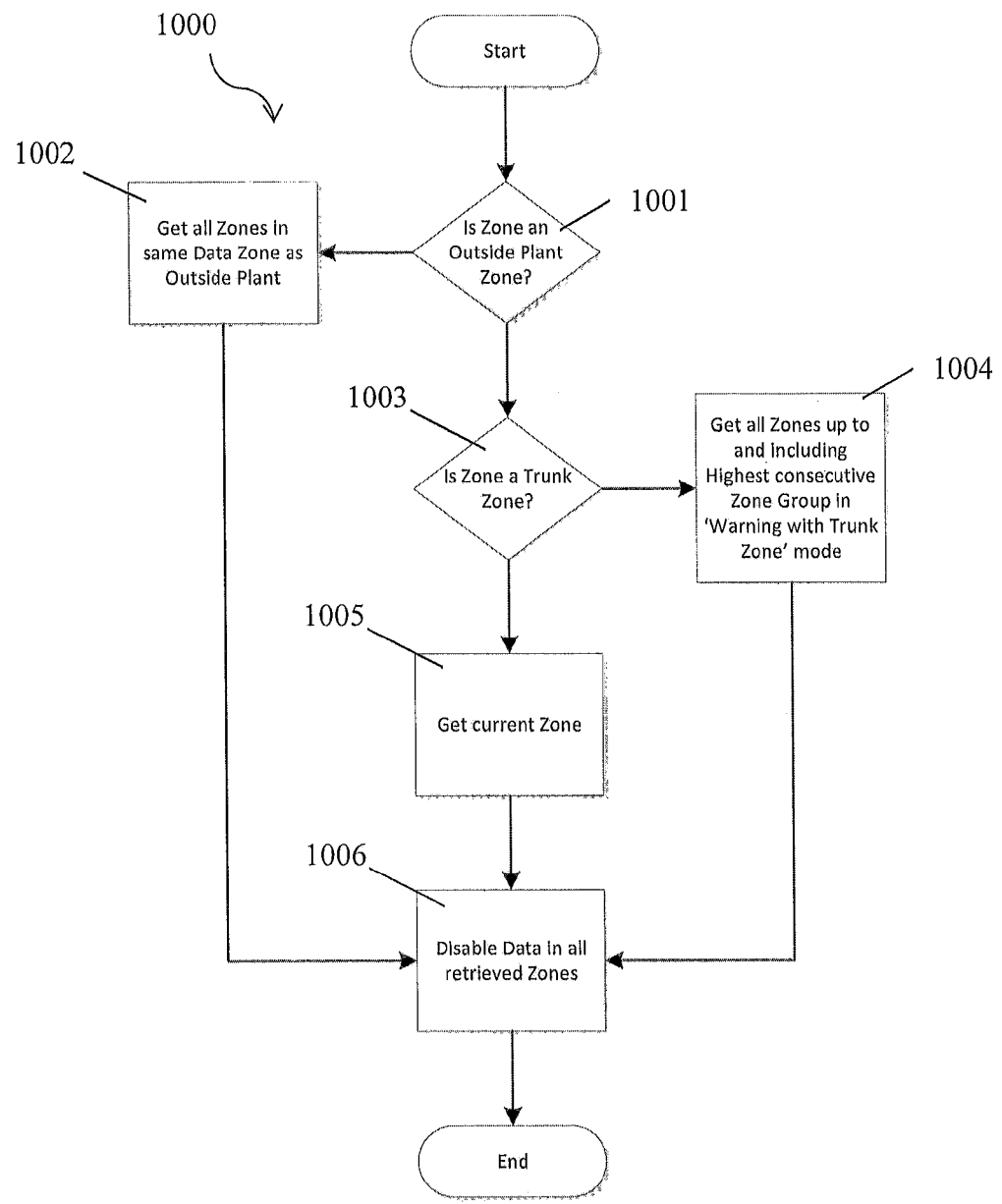
FIG. 10 is a flowchart for a process to disable data.

In FIG. 10, a flowchart for 'disable data' sub process 1000 according to an embodiment is shown. In 1001, a system may evaluate a zone type. In 1002, if a zone is an outside plant zone, the system may collect all zones in a same data zone as the outside plant zone. The system may then proceeds to 1006 to disable data in all of these zones.

In 1003, a system may evaluate if a zone is a trunk zone. If yes, the system collects all zones up to and including the highest consecutive zone group with a warning mode of 'Warning with Trunk Zone' in 1004. The system may then proceeds to 1006 to disable data in all of these zones. In 1003, if a system determines that a zone is not a trunk zone but is a user zone, the system may retrieve the current zone in 1005 and proceed to disable data in this zone in 1006.

A system may be configured to disable data by directly communicating with an optical line terminal and/or network switch by sending a command to the optical line terminal and/or network switch. A system may also be configured to disabled data by communicating with an optical circuit switch by sending a command to the optical circuit switch. While the flowchart shown in FIG. 10 and described herein depicts an exemplary workflow for a disable data sub process, other workflows arranged in a different order may be implemented.

Figure 11:
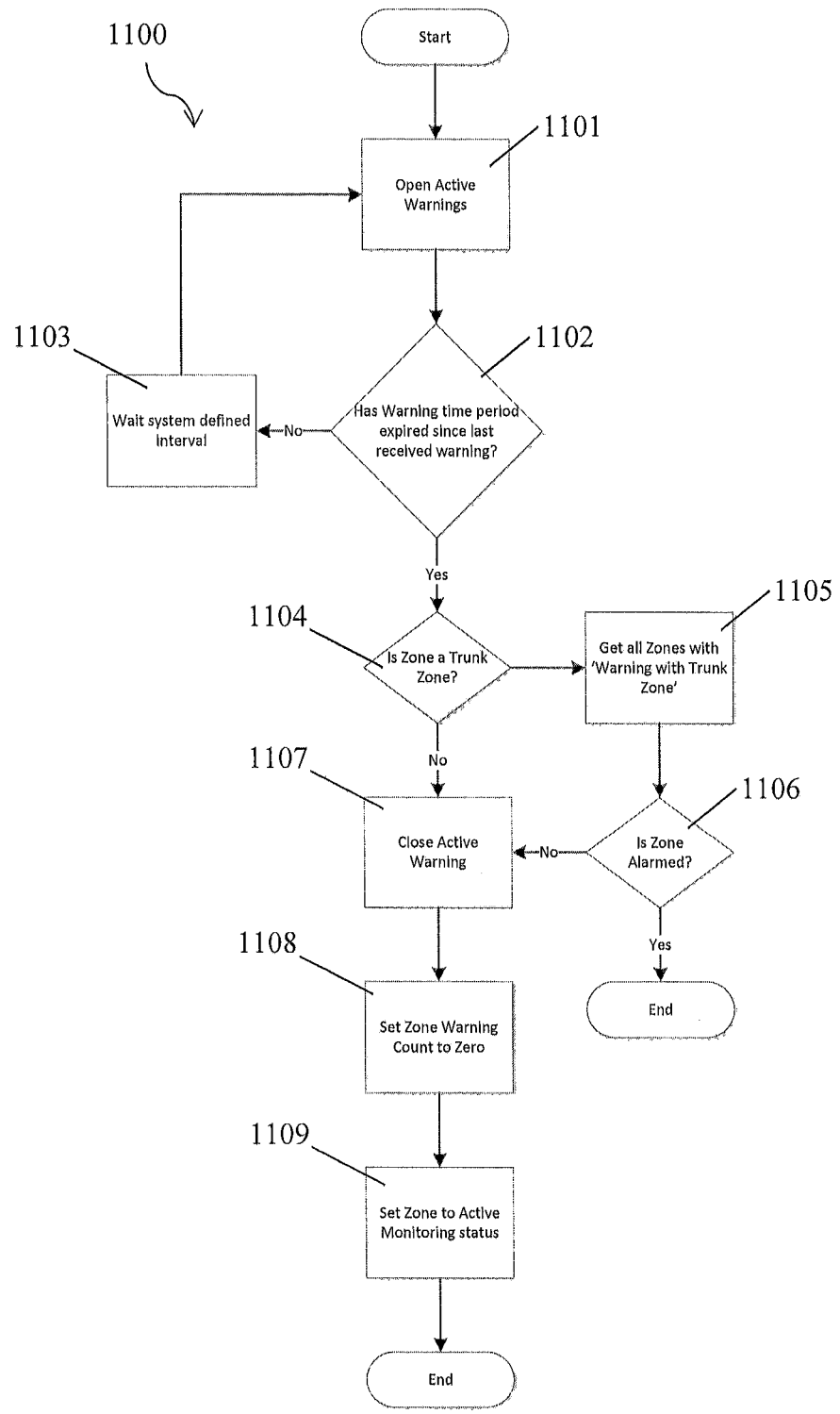
FIG. 11 is a flowchart for processing open warnings.

Turning to FIG. 11, a work flow for processing open warnings 1100 according to an embodiment is shown. In 1101, on a defined interval, a system may open all active warnings. In 1102, a system may determine if a warning time period has elapsed since last receiving a warning timestamp. If the warning time period has not elapse, the system may proceed to 1103 and wait for a defined interval before returning to check all active warnings. If the warning time period has elapsed, the system may proceed to 1104 to determine if a zone is a trunk zone. If the zone is not a trunk zone, the system may proceed to 1107 and close an active warning. If the zone is a trunk zone, the system may collect all zones up to and including the highest consecutive zone group with a warning mode of 'Warning with Trunk Zone' in 1105 and may then proceed to 1106. In 1106, a system may check if the trunk zone is alarmed. If not, the system may close the active warning in 1107. In 1108, a system may set a zone warning count to zero. In 1109, a system may set a zone status to active monitoring. While the flowchart shown in FIG. 11 and described herein depicts an exemplary workflow for processing open warnings, other workflows arranged in a different order may be implemented.

Figure 12:
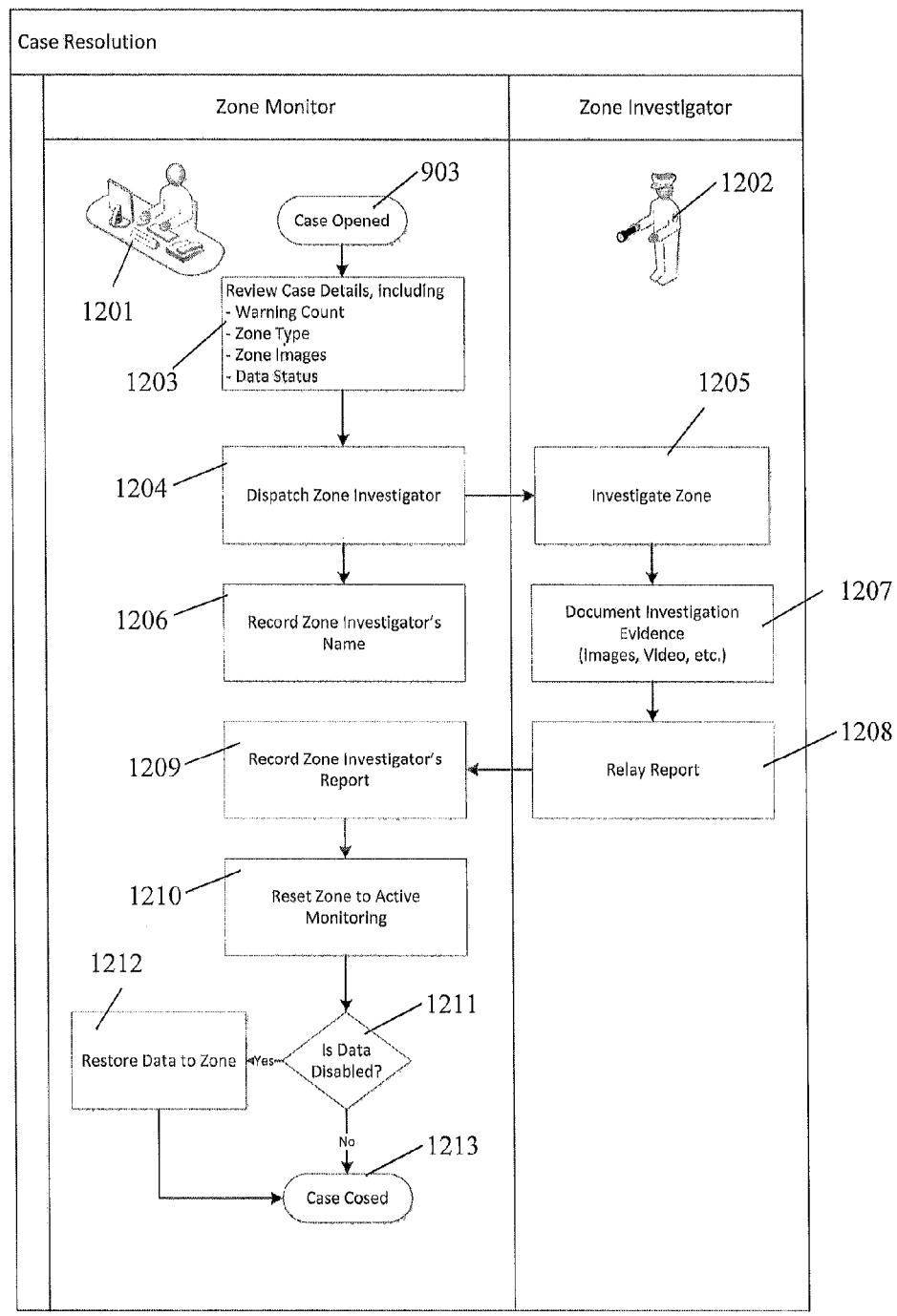
FIG. 12 is a chart showing a process for case resolution.
Figure 13:
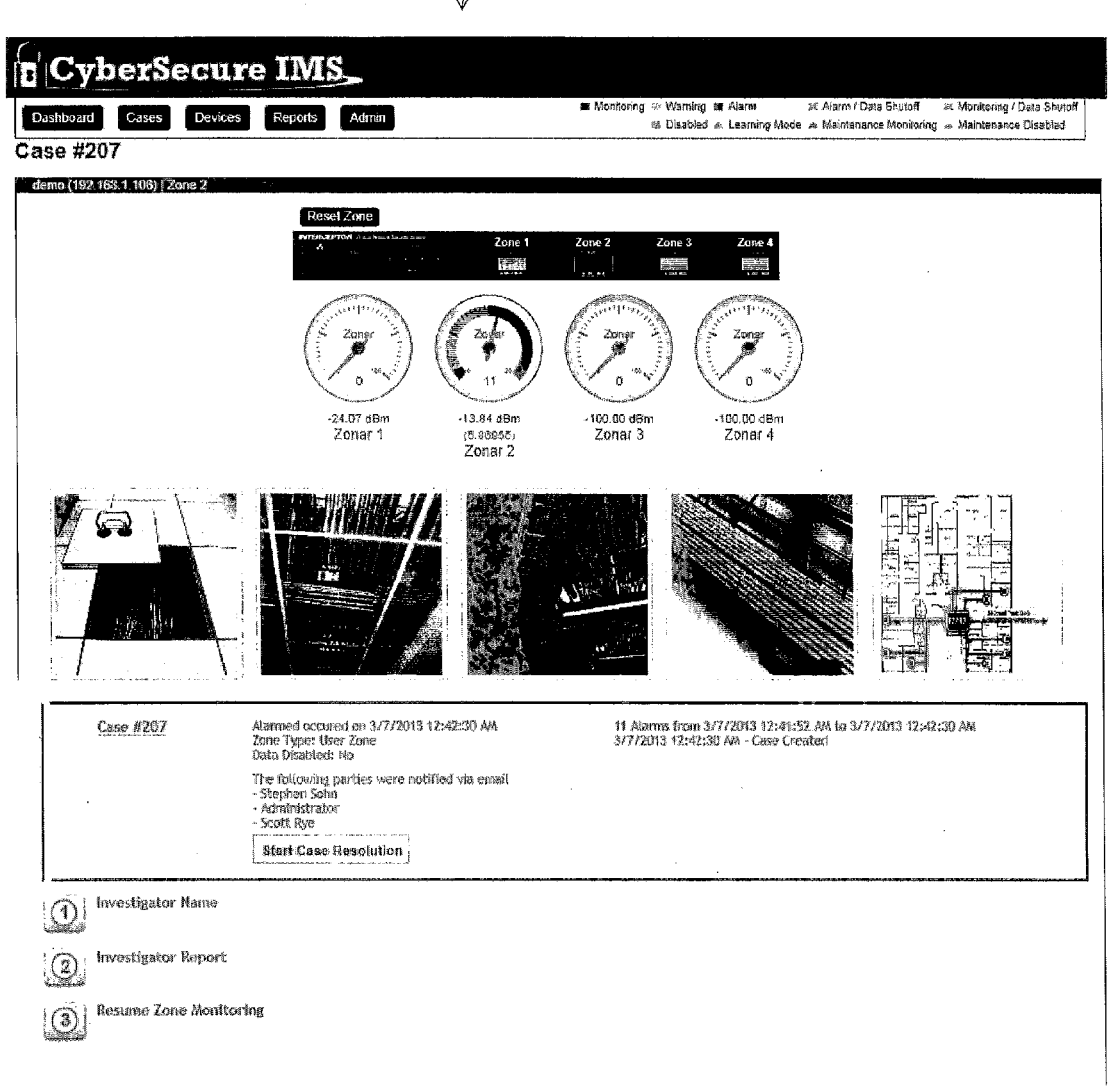
FIG. 13 is a screen shot of a case detail screen.

FIG. 12 shows a case resolution process according to an embodiment. In 1203, when a case is created, a zone monitor 1201 may open the case and review the case details. The case details displayed by a system may include warning count, zone type, zone images, zone inspection guide, notified contact personnel, and status of the data network. A case detail screen according to one embodiment is shown in FIG. 13.

In 1204, zone monitor 1201 may dispatch an investigator 1202 assigned to a zone. In 1206, zone monitor 1201 may record zone investigator's 1202 name. In 1205, zone investigator 1202 may investigate a zone based on a Standard Operating Procedure defined by a system for a zone. In 1207, zone investigator 1202 may document evidence such as images or videos of the inspection. In 1208, upon completion of an investigation, zone investigator 1202 may relay a full report in back to zone monitor 1201, including investigation evidence, a written report, and a final determination. Final determinations may include items such as intrusion, accidental contact, unscheduled maintenance, natural disaster, and other items.

In 1209, zone monitor 1201 may record zone investigator's 1202 report into a system. In 1210, a system may enable zone monitor 1201 to reset monitoring on a zone.

In 1211, when zone monitor 1201 resets monitoring on a zone, a system may check to see if data was disabled in a zone. If so, the system may allow zone monitor 1201 to restore data to the zone in 1212. Zone monitor 1201 may then restore data to the zone.

In 1213, a system may then close a case and track a time stamp for each event for audit and reporting purposes. While the workflow for a case resolution process as shown in FIG. 12 and described herein depicts an exemplary workflow, other workflows arranged in a different order may be implemented.

Figure 14:
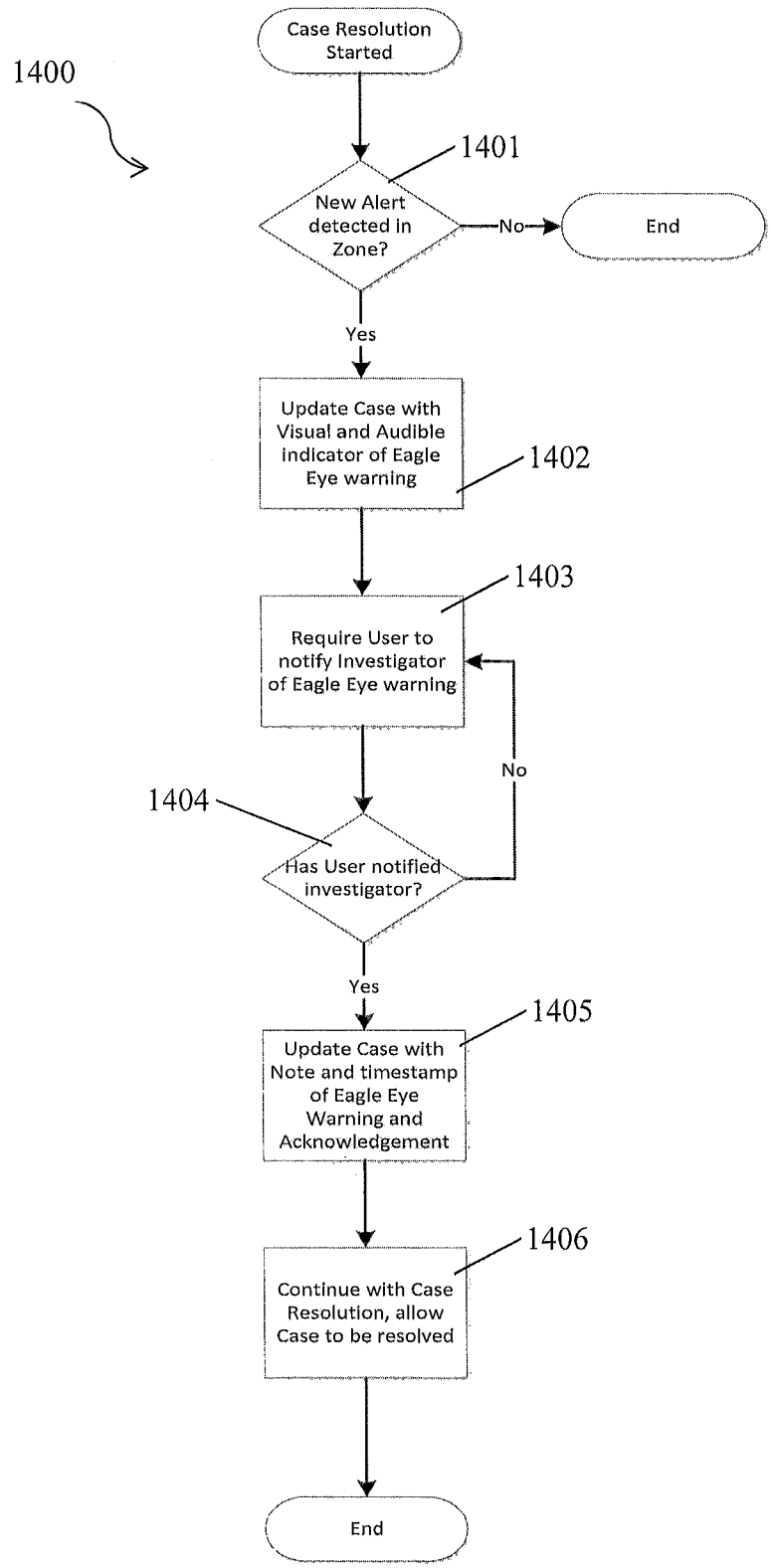
FIG. 14 is a flowchart for continued monitoring during case management.

In an embodiment, when a case is open and under review, a system may continue to monitor for new alerts in a zone. FIG. 14 shows a flowchart 1400 of a process for a system to continue monitoring during a case management. In 1401, a system may determine if a new alert is detected in a zone. In 1402, if a new alert is detected, the system may update an interface with visual and audible indicators, such as an Eagle Eye Zonar warning. This scenario may occur if an intrusion attempted is continuing. This process may provide an investigator situational awareness and allow for additional safety or response measures.

In 1403, a system may require a user to notify an investigator of the Eagle Eye Zonar warning. In 1404, a system may determine if a user has notified an investigator. If not, the system may return to 1403 to require a user to notify an investigator. In 1405, after a user notifies an investigator, the system may update a case note with information and timestamp for the Eagle Eye warning detection and user acknowledgement. In 1406, a system may then allow a user to continue with a case resolution process. While the flowchart shown in FIG. 14 and described herein depicts an exemplary workflow for a process to continue monitoring during a case management, other workflows arranged in a different order may be implemented.

According to an embodiment, a system may allow a user with an appropriate privilege the ability to modify a case resolution workflow. A system may allow for adding or removing steps into a workflow. A system may allow for routing and re-routing approval or disapproval functions to a user, collection of users, roles or a collection of roles in a system. Where appropriate, a system may allow for modification of a workflow through a graphically based user interface.

In one embodiment, a system may be configured for predictive analysis. A system may calculate the captured alert signatures (duration, count, maximum/minimum/average power, etc.) for a case as well as an associated case resolution status. A system may provide artificial intelligence capabilities in analyzing an alert signature and a resolution to compute likelihood scores for possible causes for an alert.

For a case, a system may use a predictive analysis to offer likelihood scores on the case resolutions status. For each warning, a system may provide a real-time likelihood score for a cause of an alert.

Other features of a system may provide the ability to continuously monitor a given IP address range to discover and enroll unregistered intrusion detectors. A system may allow a user to create a new enrollment task. An enrollment task may include:
- Starting IP Address
- Ending IP Address
- Login ID for Intrusion Detector
- Password for Login ID for Intrusion Detector
- Frequency at which the Enrollment Task should run (Never, Daily, Weekly)
- SNMP Credentials for communication with the Intrusion Detector
- Option to All Remote Reset of the Channel Ports of the Intrusion Detector
- Option to Disable Data in the Zones when an Alarm occurs
- Warning Threshold Count
- Warning Threshold Time Period
- Alarm Response for Intrusion Alerts (None, Report, Report & Halt, Halt)
- Alarm Response for Boundary Alerts (None, Report, Report & Halt, Halt)
- Alarm Response for Smart Filter Detect Alerts (None, Report, Report & Halt, Halt)
- Device Availability Time Period During enrollment, a system may query a discovered device and gather device specific information such as the model and the port count of the device. A system may use the information to dynamically enroll the device. A system may provide the ability to discover a variety of device models and types from one enrollment task.

After enrollment completes, a system may read an intrusion detector threshold setting. A system may disable monitoring on channel ports that are determined to not have a fiber cable plugged into it. A system may provide a wizard based workflow to allow a user to provide additional information to configure an enrolled device.

According to another embodiment, a system may provide the ability to set a specific channel port on an intrusion detector into a Learning Mode or Auto Configure. In this mode, an intrusion detector observes a fiber for a channel port for a configurable period of time to determine an optimal monitoring parameter that may be used for monitoring intrusions, excessive optical gains/losses or environmental changes.

A system may be configured to allow a user with an appropriate privilege an option to perform Learning Mode. When the option is selected, the system may present an allowed user with a screen offering various time periods. When a user initiates a task in a system, the system sends an appropriate command to an intrusion detector to begin Learning Mode. A system may set the channel port Report only for any alert and not send Halt alerts. At any time during Learning Mode, a system may allow a user to abort Learning Mode. A system may continue to receive a detected alert during Learning Mode and may record the results in the system for further consideration by a user.

When Learning Mode completes, a system may receive a notification from an intrusion detector. A system may read and record a threshold setting determined during Learning Mode and associate the setting to a specific zone. A system may reset a channel port back from Report only to a previous setting.

A system may read and record a current threshold setting of a channel port of an intrusion detector and associate the setting to a specific zone. For a setting, a system may indicate if the setting was Learned, set by Default, or set by a User.

A system may allow a user with an appropriate privilege the ability to sync a setting from a device to a system. A system may allow a user with an appropriate privilege the ability to edit any or all of the settings. When a user initiates a task in a system to update a setting, the system may send an appropriate command to an intrusion detector to update the settings based on the user provided values. Any settings unchanged by a user remain unaffected.

A system may be deployed for various purposes. In one embodiment, a system may be used to verify whether a data infrastructure is suitable for alarmed carrier PDS. This testing process maybe used pre-deployment on existing cables and conduit or during post-deployment testing process to validate new installations of alarmed cables and conduit.

While the invention has been described in detail with reference to particularly preferred embodiments, those skilled in the art will appreciate that various modifications may be made thereto without significantly departing from the spirit and scope of the invention.

What is claimed:

1. A method for managing a protective distribution system, comprising:
    monitoring an information transmission line, wherein the information transmission line comprises a first segment and a second segment that are assigned to one segment group and one or more other segments that are assigned to another segment group, the first segment of the information transmission line does not include a trunk cable, and the second segment of the information transmission line includes a trunk cable;
    detecting a disturbance on the first segment of the information transmission line, wherein the detected disturbance does not exceed a first preset threshold for triggering alerts of a first alert type based on detected disturbances;
    determining, responsive to the detection, a count for the number of disturbances within a first preset time period that do not exceed the first preset threshold;
    determining whether the count, for the number of disturbances that do not exceed the first preset threshold, exceeds a second preset threshold, wherein the second preset threshold corresponds to a preset number of allowable disturbances within the first preset time period;
    triggering an alert of the first alert type responsive to a determination that the count exceeds the second preset threshold;
    determining whether an alert of a second alert type with respect to the second segment has occurred within a second preset time period;
    determining whether a mode associated with the first segment of the information transmission line indicates an issue with the second segment of the information transmission line; and
    modifying the mode associated with the first segment of the information transmission line to indicate an issue with the second segment of the information transmission line responsive to a determination that the alert of the second alert type has occurred within the second preset time period and that the mode associated with the first segment of the information transmission line does not indicate an issue with the second segment of the information transmission line.

2. The method of claim 1, wherein: (1) the detected disturbance is of a first disturbance type; (2) the first preset threshold is a threshold for triggering alerts of the first alert type based on detected disturbances of the first disturbance type; and (3) the second preset threshold corresponds to a preset number of allowable disturbances of the first disturbance type within the first preset time period.

3. The method of claim 2, wherein the detected disturbance of the first disturbance type comprises at least one of a vibration, a frequency change, an acoustic change, and a change in distance based on reflectometer reading, and a disturbance of a second disturbance type comprises at least a different one of a vibration, a frequency change, an acoustic change, and a change in distance based on reflectometer reading.

4. The method of claim 1, further comprising:
    initiating a response to the detected disturbance based on the triggering of the alert of the first alert type, wherein the response comprises at least one of opening a case, dispatching an investigator to investigate the detected disturbance, and documenting the investigation in the case.

5. The method of claim 4, wherein the response further comprises at least one of disabling a data collection, adjusting a physical security device, rerouting a data collection, and performing network analysis.

6. The method of claim 1, wherein the count is for the number of disturbances within the first preset time period that do not exceed the first preset threshold, but exceeds a third preset threshold.

7. The method of claim 1, further comprising collecting data on the disturbance.

8. The method of claim 1, further comprising:
    modifying modes associated with other segments of the information transmission line that are assigned to the same segment group as the first segment and the second segment responsive to the determination that the alert of the second alert type has occurred within the second preset time period and that the mode associated with the first segment does not indicate an issue with the second segment.

9. A non-transitory computer-readable medium for storing computer instructions therein, the computer-readable medium comprising a set of instructions which when executed causes a processor to perform a method for managing a protective distribution system, the method comprising:
    monitoring an information transmission line, wherein the information transmission line comprises a first segment and a second segment that are assigned to one segment group and one or more other segments that are assigned to another segment group, the first segment of the information transmission line does not include a trunk cable, and the second segment of the information transmission line includes a trunk cable;
    detecting a disturbance on the first segment of the information transmission line, wherein the detected disturbance does not exceed a first preset threshold for triggering alerts of a first alert type based on detected disturbances;
    determining, responsive to the detection, a count for the number of disturbances within a first preset time period that do not exceed the first preset threshold;
    determining whether the count, for the number of disturbances that do not exceed the first preset threshold, exceeds a second preset threshold, wherein the second preset threshold corresponds to a preset number of allowable disturbances within the first preset time period;
    triggering an alert of the first alert type responsive to a determination that the count exceeds the second preset threshold;
    determining whether an alert of a second alert type with respect to the second segment has occurred within a second preset time period;

determining whether a mode associated with the first segment of the information transmission line indicates an issue with the second segment of the information transmission line; and modifying the mode associated with the first segment of the information transmission line to indicate an issue with the second segment of the information transmission line responsive to a determination that the alert of the second alert type has occurred within the second preset time period and that the mode associated with the first segment of the information transmission line does not indicate an issue with the second segment of the information transmission line.

10. The non-transitory computer-readable medium of claim 9, wherein: (1) the detected disturbance is of a first disturbance type; (2) the first preset threshold is a threshold for triggering alerts of the first alert type based on detected disturbances of the first disturbance type; and (3) the second preset threshold corresponds to a preset number of allowable disturbances of the first disturbance type within the first preset time period.

11. The non-transitory computer-readable medium of claim 10, wherein the detected disturbance of the first disturbance type comprises at least one of a vibration, a frequency change, an acoustic change, and a change in distance based on reflectometer reading, and a disturbance of a second disturbance type comprises at least a different one of a vibration, a frequency change, an acoustic change, and a change in distance based on reflectometer reading.

12. The non-transitory computer-readable medium of claim 9, wherein the count is for the number of disturbances within the first preset time period that do not exceed the first preset threshold, but exceeds a third preset threshold.

13. A system for managing an information transmission line, comprising:
a computer system comprises one or more processors programmed to execute computer program instructions which, when executed, cause the computer system to:
monitor an information transmission line, wherein the information transmission line comprises a first segment and a second segment that are assigned to one segment group and one or more other segments that are assigned to another segment group, the first segment of the information transmission line does not include a trunk cable, and the second segment of the information transmission line includes a trunk cable;
detect a disturbance on the first segment of the information transmission line, wherein the detected disturbance does not exceed a first preset threshold for triggering alerts of a first alert type based on detected disturbances;
determine, responsive to the detection, a count for the number of disturbances within a first preset time period that do not exceed the first preset threshold;
determine whether the count, for the number of disturbances that do not exceed the first preset threshold, exceeds a second preset threshold, wherein the second preset threshold corresponds to a preset number of allowable disturbances within the first preset time period;
trigger an alert of the first alert type responsive to a determination that the count exceeds the second preset threshold;
determine whether an alert of a second alert type with respect to the second segment has occurred within a second preset time period;
determine whether a mode associated with the first segment of the information transmission line indicates an issue with the second segment of the information transmission line; and
modify the mode associated with the first segment of the information transmission line to indicate an issue with the second segment of the information transmission line responsive to a determination that the alert of the second alert type has occurred within the second preset time period and that the mode associated with the first segment of the information transmission line does not indicate an issue with the second segment of the information transmission line.

14. The system of claim 13, further comprising:
an intrusion detector coupled to the computer system,
wherein the disturbance is detected by the computer system via the intrusion detector.

15. The system of claim 14, further comprising:
an optical line terminal or network switch;
an optical circuit switch;
an optical test access point device;
a network analytic tool; and
a video camera.

16. The system of claim 13, wherein: (1) the detected disturbance is of a first disturbance type; (2) the first preset threshold is a threshold for triggering alerts of the first alert type based on detected disturbances of the first disturbance type; and (3) the second preset threshold corresponds to a preset number of allowable disturbances of the first disturbance type within the first preset time period.

17. The system of claim 16, wherein the detected disturbance of the first disturbance type comprises at least one of a vibration, a frequency change, an acoustic change, and a change in distance based on reflectometer reading, and a disturbance of a second disturbance type comprises at least a different one of a vibration, a frequency change, an acoustic change, and a change in distance based on reflectometer reading.

18. The system of claim 13, wherein the count is for the number of disturbances within the first preset time period that do not exceed the first preset threshold, but exceeds a third preset threshold.

* * * * *